(12) United States Patent
Bounasser et al.

(10) Patent No.: US 11,270,246 B2
(45) Date of Patent: Mar. 8, 2022

(54) REAL-TIME INTELLIGENT AND DYNAMIC DELIVERY SCHEDULING

(71) Applicant: Accenture Global Solutions Limited, Dublin (IE)

(72) Inventors: Moustafa Bounasser, Newcastle upon Tyne (GB); Gabriel Churchill, London (GB); Akbar Iqbal, London (GB); Eleanor R. Kelly, London (GB)

(73) Assignee: Accenture Global Solutions Limited, Dublin (IE)

( * ) Notice: Subject to any disclaimer, the term of this patent is extended or adjusted under 35 U.S.C. 154(b) by 901 days.

(21) Appl. No.: 15/614,171

(22) Filed: Jun. 5, 2017

(65) Prior Publication Data

US 2018/0349844 A1    Dec. 6, 2018

(51) Int. Cl.
*G06Q 10/08* (2012.01)
*H04L 51/02* (2022.01)
(Continued)

(52) U.S. Cl.
CPC ......... *G06Q 10/0833* (2013.01); *G06F 40/20* (2020.01); *G06Q 10/083* (2013.01);
(Continued)

(58) Field of Classification Search
CPC ......... G06Q 10/0833; G06Q 10/06312; G06Q 10/08355; G06Q 10/083; G06Q 50/28;
(Continued)

(56) References Cited

U.S. PATENT DOCUMENTS 8,615,473 B2   12/2013 Spiegel et al.
10,275,824 B2 *  4/2019 Peterson ............ G06Q 30/0639
(Continued)

FOREIGN PATENT DOCUMENTS

CN    103811009 A    5/2014
CN    103838773 A    6/2014
(Continued)

OTHER PUBLICATIONS

Schafer, J. Ben, Joseph A. Konstan, and John Riedl. "E-commerce recommendation applications." Data mining and knowledge discovery 5.1 (2001): 115-153. (Year: 2001).*

(Continued)

*Primary Examiner* — Scott M Tungate
(74) *Attorney, Agent, or Firm* — Harrity & Harrity, LLP

(57) ABSTRACT

A device may receive first data associated with a delivery of an item or service. The first data may be received from a system in association with an order being placed for the item or service. The device may receive second data associated with scheduling the delivery from another device. A portion of the second data may include natural language text data, or natural language audio data. The device may process the first data and the second data using a processing technique to identify information related to scheduling the delivery. The device may perform an action related to the delivery. The action may include scheduling the delivery based on a result of processing the first data and the second data, monitoring the first data and the second data, or modifying the delivery based on monitoring the first data and the second data.

20 Claims, 9 Drawing Sheets

(51) Int. Cl.
*H04L 51/10* (2022.01)
*G06Q 50/28* (2012.01)
*G06F 40/20* (2020.01)

(52) U.S. Cl.
CPC ....... *G06Q 10/08355* (2013.01); *G06Q 50/28* (2013.01); *H04L 51/02* (2013.01); *H04L 51/10* (2013.01)

(58) Field of Classification Search
CPC ......... G10L 15/26; G10L 15/22; H04L 51/10; H04L 51/02; G06F 40/20
See application file for complete search history.

(56) References Cited

U.S. PATENT DOCUMENTS

| | | | |
|---|---|---|---|
| 10,382,370 B1 * | 8/2019 | Labarre | H04L 51/02 |
| 10,614,410 B2 | 4/2020 | Gillen et al. | |
| 10,621,540 B1 * | 4/2020 | Huddar | G06Q 10/0833 |
| 10,733,563 B2 | 8/2020 | Sager et al. | |
| 2006/0235739 A1 * | 10/2006 | Levis | G06Q 10/08 705/1.1 |
| 2010/0076903 A1 * | 3/2010 | Klingenberg | G06Q 10/0833 705/333 |
| 2012/0260263 A1 | 10/2012 | Edoja | |
| 2015/0006005 A1 | 1/2015 | Yu et al. | |
| 2015/0088825 A1 | 3/2015 | Bloom et al. | |
| 2015/0292894 A1 * | 10/2015 | Goddard | G01C 21/3453 701/400 |
| 2016/0180288 A1 | 6/2016 | Sager et al. | |
| 2016/0247095 A1 * | 8/2016 | Scicluna | G06Q 10/02 |
| 2017/0046656 A1 * | 2/2017 | Bramble | G06Q 10/0831 |

FOREIGN PATENT DOCUMENTS

| | | |
|---|---|---|
| CN | 104361063 A | 2/2015 |
| CN | 104885110 A | 9/2015 |
| CN | 105989550 A | 10/2016 |
| CN | 106104593 A | 11/2016 |
| CN | 106133765 A | 11/2016 |
| CN | 106202205 A | 12/2016 |

OTHER PUBLICATIONS

UPS, "UPS My Choice," https://wwwapps.ups.com/mcdp?loc=en_GB, Oct. 4, 2014, 2 pages.
Dpdgroup, "DPD Germany sets benchmark with new app," https://www.dpd.com/home/news/latest_news/dpd_germany_sets_benchmark_with_new_app, Sep. 17, 2015, 3 pages.
Andrew Dalton, "Uber is ready to help truck drivers find cargo," https://www.engadget.com/2017/05/18/uber-is-ready-to-help-truck-drivers-find-cargo/, May 18, 2017, 9 pages.
Deliv, "Same Day Delivery Is Not a New Concept," http://www.deliv.co/about/#, Oct. 4, 2014, 7 pages.
Crunchbase Inc., "Dada," https://www.crunchbase.com/organization/dada, Jun. 1, 2016, 4 pages.
Oracle, "Siebel Communications Guide," http://docs.oracle.com/cd/E14004_01/books/PDF/CommSIA.pdf, Sep. 2013, 288 pages.
ContactEngine, "ContactEngine: A Customer Communications Management Platform," www.contactengine.com, Mar. 16, 2016, 10 pages.
Wikipedia, "Chatbot," https://en.wikipedia.org/wiki/Chatbot, Jun. 1, 2017, 6 pages.
Extended European Search Report corresponding to EP 18 17 3938.4, dated Jul. 13, 2018, 9 pages.

* cited by examiner

REAL-TIME INTELLIGENT AND DYNAMIC DELIVERY SCHEDULING

BACKGROUND

A chatbot (e.g., a talkbot, a chatterbot, a bot, or an artificial conversational entity) may include a computer program that conducts a conversation via auditory or textual methods. In some cases, chatbots are designed to simulate how a human would behave as a conversational partner. A chatbot may be used in a dialog system for various practical purposes including customer service or information acquisition.

SUMMARY

According to some possible implementations, a first device may comprise one or more processors to receive first data associated with a delivery of an item or service. The first data may be received from a system associated with the first device. The one or more processors may receive second data associated with scheduling the delivery. At least a portion of the second data may be received from a second device that is not associated with the system associated with the first device. The second data may include calendar data, weather data, or traffic data. The one or more processors may process the first data and the second data using a processing technique to identify information related to scheduling the delivery. The one or more processors may perform an action related to the delivery. The action may include communicating with a recipient of the delivery to schedule the delivery based on a result of processing the first data and the second data, communicating with a delivery agent to schedule the delivery based on the result of processing the first data and the second data, monitoring the first data or the second data to determine a modification to the first data or the second data, or modifying the delivery based on the modification to the first data or the second data.

According to some possible implementations, a method may comprise receiving, by a device, first data associated with multiple deliveries of multiple items or services. The first data may identify multiple recipients to which the multiple items or services are to be delivered, or multiple types of the multiple items or services to be delivered. The method may include receiving, by the device, second data associated with scheduling the multiple deliveries. A first portion of the second data may be received via a chatbot that can communicate with multiple second devices associated with the multiple recipients. A second portion of the second data may be received from multiple third devices. The method may include processing, by the device, the first data and the second data using multiple processing techniques to identify information related to scheduling the multiple deliveries. The method may include performing, by the device, multiple actions related to the multiple deliveries. The multiple actions may include scheduling at least one of the multiple deliveries based on a result of processing the first data and the second data, monitoring the first data or the second data to determine a modification to the first data or the second data, or modifying at least one of the multiple deliveries based on the modification to the first data or the second data.

According to some possible implementations, a non-transitory computer-readable medium may store one or more instructions that, when executed by one or more processors, cause the one or more processors to receive first data associated with one or more deliveries of one or more items or services. The first data may be received from one or more systems in association with one or more orders being placed for the one or more items or services. The one or more instructions, when executed by the one or more processors, may cause the one or more processors to receive second data associated with scheduling the one or more deliveries from one or more devices. One or more portions of the second data may include natural language text data, or natural language audio data. The one or more instructions, when executed by the one or more processors, may cause the one or more processors to process the first data and the second data using one or more processing techniques to identify information related to scheduling the one or more deliveries. The one or more processing techniques may include natural language processing, or artificial intelligence processing. The one or more instructions, when executed by the one or more processors, may cause the one or more processors to perform one or more actions related to the one or more deliveries. The one or more actions may include scheduling the one or more deliveries based on a result of processing the first data and the second data, monitoring the first data and the second data, or modifying the one or more deliveries based on monitoring the first data and the second data.

DETAILED DESCRIPTION

The following detailed description of example implementations refers to the accompanying drawings. The same reference numbers in different drawings may identify the same or similar elements.

An organization may deliver an item and/or a service to an individual (or another organization or recipient). While the organization may be capable of coordinating delivery on a particular day and/or location at the time the delivery is scheduled, the organization and/or the individual may lack a computer-based system for managing the "last mile," or "last hour," of the delivery. For example, the organization and/or the individual may not be capable of modifying delivery to account for weather, traffic, individual preference, a scheduling conflict, and/or the like once a delivery vehicle is in route to deliver the item and/or the service.

Some implementations, described herein, provide a delivery system that is capable of receiving first data associated with a delivery of an item and/or service, receiving second data associated with scheduling the delivery, processing the first data and/or the second data to intelligently schedule the delivery, and/or performing an action related to the delivery. In this way, the delivery system provides a computer-based system to intelligently manage the "last mile" or "last hour"

of a delivery (e.g., based on weather data, calendar data, traffic data, etc.), thereby improving a delivery. In addition, this conserves resources, such as processing resources of a device scheduling a delivery, vehicle-related resources, such as fuel, cost, or wear-and-tear related to performing a delivery, and/or the like, by reducing or eliminating a need for a delivery to be scheduled and/or attempted multiple times. Further, this improves an individual's experience related to a delivery via intelligent and dynamic scheduling of the delivery.

Figure 1:
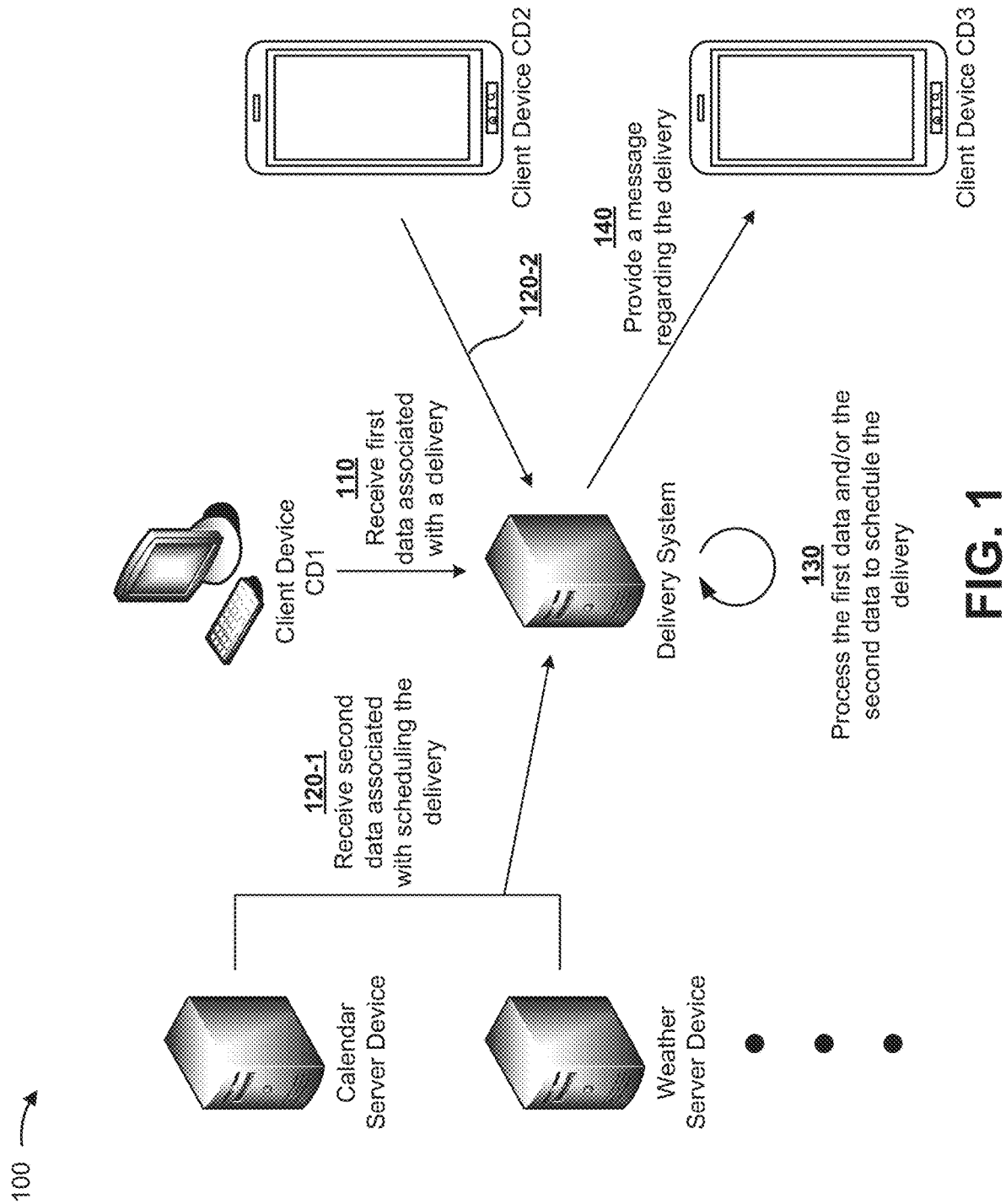
FIG. 1 is a diagram of an overview of an example implementation described herein.

FIG. 1 is a diagram of an overview of an example implementation 100 described herein. As shown in FIG. 1, example implementation 100 may include a delivery system, a set of server devices (e.g., a calendar server device, a weather server device, etc.), and/or a set of client devices (e.g., client devices CD1 through CD3).

As shown in FIG. 1, and by reference number 110, the delivery system may receive first data associated with a delivery. For example, the delivery system may receive a set of instructions to schedule a delivery for an item and/or a service (e.g., at a particular location and/or on a particular date). When receiving first data, the delivery system may receive millions, billions, billions, etc. of data elements associated with millions, billions, trillions, etc. of deliveries. In this way, the delivery system may receive a data set that cannot be processed manually or objectively by human operators.

As shown by reference numbers 120-1 and 120-2, the delivery system may receive second data associated with scheduling the delivery. For example, the delivery system may receive calendar data from the calendar server device (e.g., data related to a calendar of an individual that is to receive the delivery), weather data from the weather server device, and/or the like. Additionally, or alternatively, and as another example, the delivery system may receive data from client device CD2 related to an individual's availability, delivery preferences, modifications to a previously scheduled delivery, and/or the like. When receiving the second data, the delivery system may receive millions, billions, trillions, etc. of data elements associated with millions, billions, trillions, etc. of deliveries. In this way, the delivery system may receive a data set that cannot be processed manually or objectively by human operators.

The delivery system may receive the second data from client device CD2 via a chatbot. For example, the delivery system may use a chatbot to intelligently communicate with a user of user device CD2 to schedule a delivery, to modify a delivery (e.g., based on an unavailability of the user, inclement weather, etc.) in a conversational manner. This improves communications between the delivery system and a user of client device CD2.

As shown by reference number 130, the delivery system may process the first data and/or the second data to schedule the delivery. For example, the delivery system may process calendar data associated with an individual to identify a convenient time for the individual to receive the delivery, weather data to identify a day and/or time when weather is acceptable for the delivery or when to modify the delivery, traffic data to reschedule or re-route the delivery, chatbot communications to identify a preference of the individual, and/or the like.

When processing the first data and/or the second data, the delivery system may use a technique. For example, the delivery system may use machine learning to identify an individual's preference based on prior deliveries of the same individual or a different individual. Additionally, or alternatively, and as another example, the delivery system may use a text and/or audio processing technique, such as natural language processing and/or speech-to-text, to process communications with client device CD2 (e.g., chatbot communications, a call, etc.). The delivery system may process the first data and/or the second data using a technique to identify a term and/or phrase related to scheduling the delivery, such as a preferred date and/or time, a modification to a previously scheduled delivery, and/or the like. This permits the delivery system to intelligently schedule a delivery, thereby improving a delivery of an item and/or a service.

As shown by reference number 140, the delivery system may provide a message regarding the delivery to client device CD3. For example, the message may include information regarding a date and/or time for a delivery or re-scheduled delivery, a location or an updated location for a delivery, and/or the like. In some cases, client device CD3 may be associated with a driver of a delivery vehicle (e.g., a mobile phone of a driver). Additionally, or alternatively, client device CD3 may include a navigation system of an autonomous vehicle, and the message may include a set of instructions related to a delivery.

The delivery system may perform the functions described above in real-time. For example, the delivery system may receive a modification to a delivery location from client device CD2 after an item has left a facility for delivery. In this case, the delivery system may update information identifying the delivery location and may provide the update to client device CD3 and/or a delivery vehicle automatically and in real-time. This conserves resources by reducing or eliminating a failed delivery, such as due to an individual not being present at an originally scheduled delivery location and improves the "last mile" and/or "last hour" of a delivery.

In this way, a delivery system provides a computer-based system to intelligently manage the "last mile" or "last hour" of a delivery (e.g., based on weather data, calendar data, etc.), thereby improving a delivery. In addition, this conserves resources (e.g., processing resources of a device scheduling deliveries, vehicle-related resources, such as fuel or wear-and-tear, etc.) related to performing a delivery, and/or the like, by reducing or eliminating a need for deliveries to be scheduled and/or attempted multiple times. Further, this improves an individual's experience related to a delivery via intelligent and dynamic scheduling of the delivery.

As indicated above, FIG. 1 is provided merely as an example. Other examples are possible and may differ from what was described with regard to FIG. 1.

Figure 2:
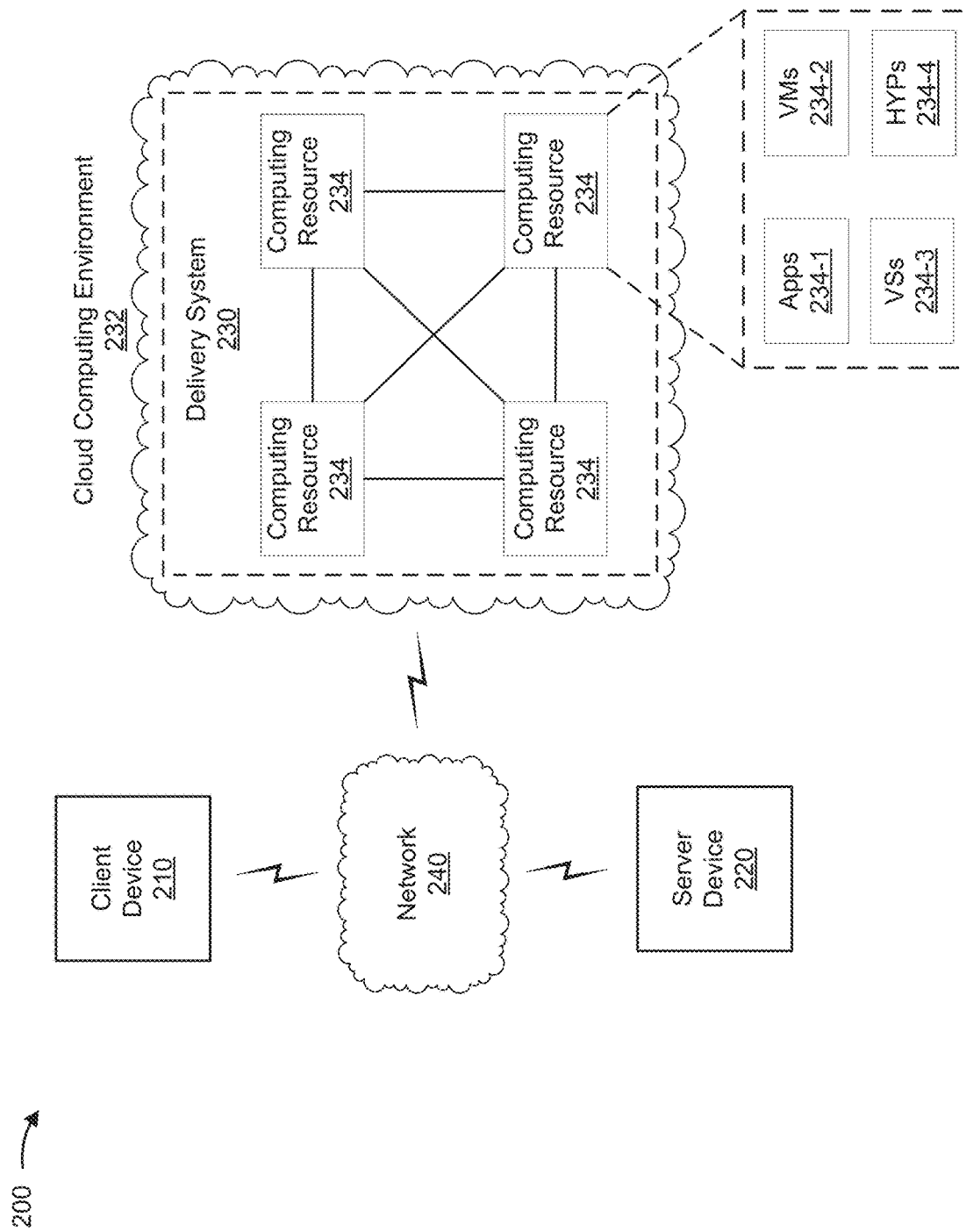
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 210, server device 220, delivery system 230, cloud computing environment 232, and a set of computing resources 234. Devices of environment 200 may interconnect via wired connections, wireless connections, or a combination of wired and wireless connections.

Client device 210 includes one or more devices capable of receiving, generating, storing, processing, and/or providing information associated with a delivery. For example, client device 210 may include a desktop computer, a mobile phone (e.g., a smart phone or a radiotelephone), a laptop computer, a tablet computer, a gaming device, a wearable communication device (e.g., a smart wristwatch or a pair of smart eyeglasses), a navigation device (e.g., a global positioning system (GPS) navigation device), or a similar type of device. In some implementations, client device 210 may receive data associated with a delivery, as described elsewhere herein. Additionally, or alternatively, client device 210 may provide data (e.g., via a chatbot) to schedule or to modify a delivery, as described elsewhere herein. In some implementations, client device 210 may be associated with an autonomous vehicle (e.g., an unmanned aerial vehicle (UAV)) or a robot, as described elsewhere herein. While a single client device 210 is shown in FIG. 2, in practice, there can be hundreds, thousands, millions, etc. of client devices 210 in communication with delivery system 230.

Server device 220 includes one or more devices capable of receiving, generating, storing, processing, and/or providing information associated with a delivery. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may provide, to delivery system 230, information related to a delivery, as described elsewhere herein. Additionally, or alternatively, server device 220 may store information related to a delivery (e.g., to facilitate machine learning), as described elsewhere herein. While a single server device 220 is shown in FIG. 2, in practice, there can be hundreds, thousands, millions, etc. of server devices 220 in communication with delivery system 230.

Delivery system 230 includes one or more devices capable of intelligently analyzing data related to a delivery and scheduling the delivery. For example, delivery system 230 may include a cloud server or a group of cloud servers. In some implementations, delivery system 230 may be designed to be modular such that certain software components can be swapped in or out depending on a particular need. As such, delivery system 230 may be easily and/or quickly reconfigured for different uses.

In some implementations, as shown, delivery system 230 may be hosted in cloud comporting environment 232. Notably, while implementations described herein describe delivery system 230 as being hosted in cloud computing environment 232, in some implementations, delivery system 230 may not be cloud-based (i.e., may be implemented outside of a cloud computing environment) or may be partially cloud-based.

Cloud computing environment 232 includes an environment that hosts delivery system 230. Cloud computing environment 232 may provide computation, software, data access, storage, and/or other services that do not require end-user knowledge of a physical location and configuration of a system and/or a device that hosts delivery system 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host delivery system 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with delivery system 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
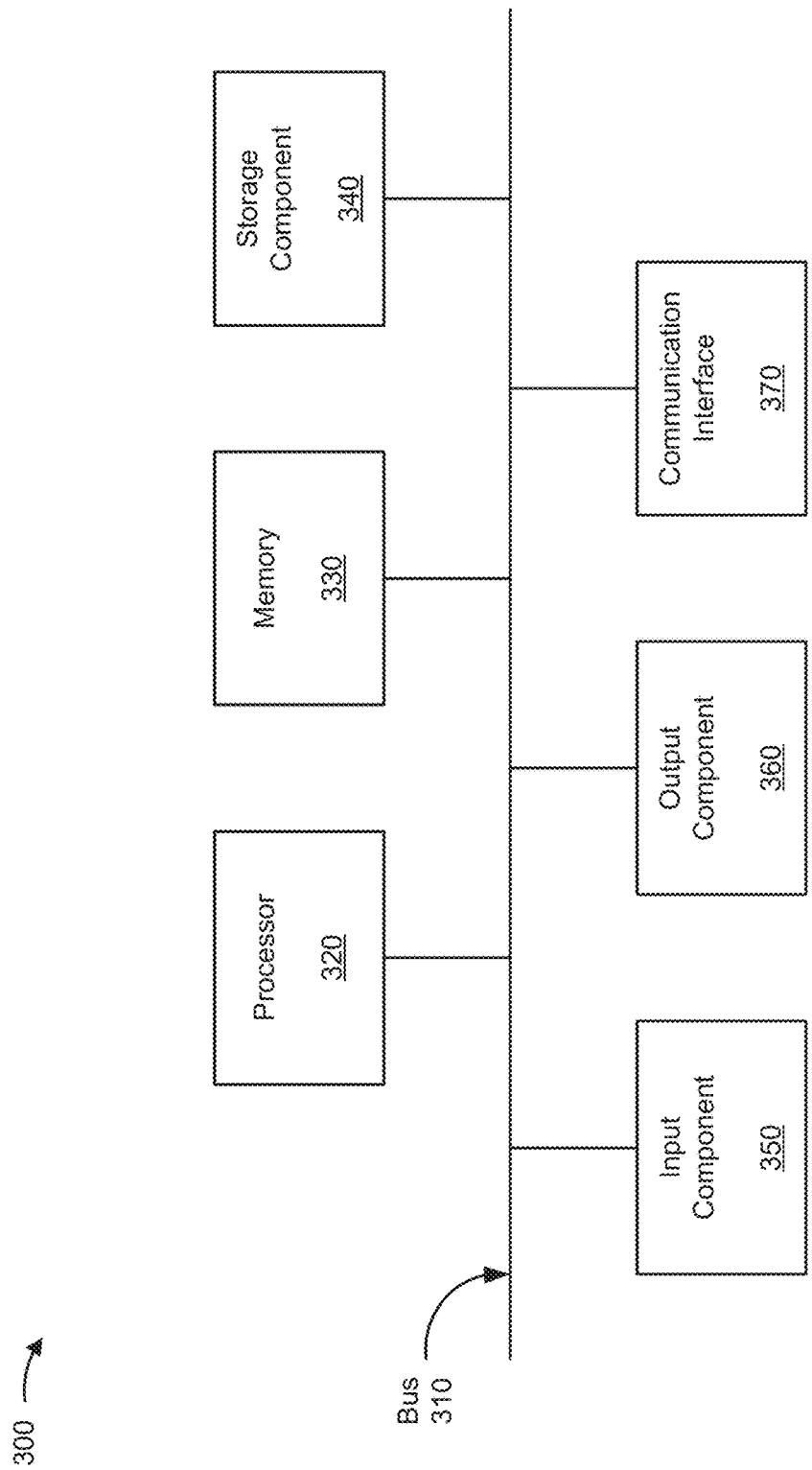
FIG. 3 is a diagram of example components of one or more devices of FIG. 2.

FIG. 3 is a diagram of example components of a device 300. Device 300 may correspond to client device 210, server device 220, and/or delivery system 230. In some implementations, client device 210, server device 220, and/or delivery system 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device flash memory, a magnetic memory, and/or an optical memory) that stores information and/or instructions for use by processor 320.

Storage component 340 stores information and/or software related to the operations and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry ay be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
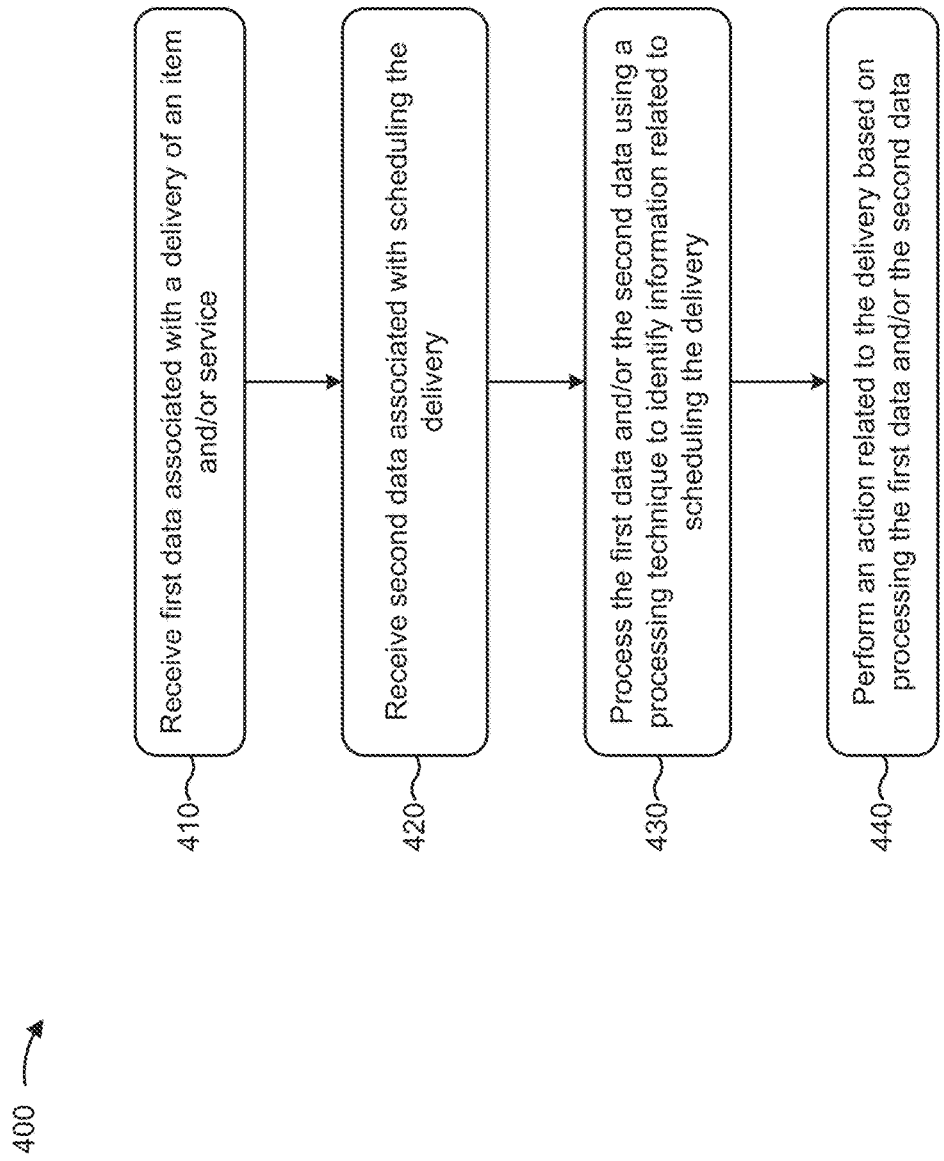
FIG. 4 is a flow chart of an example process for real-time intelligent and dynamic delivery scheduling.

FIG. 4 is a flow chart of an example process 400 for real-time intelligent and dynamic delivery scheduling. In some implementations, one or more process blocks of FIG. 4 may be performed by delivery system 230. In some implementations, one or more process blocks of FIG. 4 may be performed by another device or a group of devices separate from or including delivery system 230, such as client device 210 and server device 220.

As shown in FIG. 4, process 400 may include receiving first data associated with a delivery of an item and/or service (block 410). For example, delivery system 230 may receive, from one or more server devices 220, first data associated with a delivery of an item and/or service. In sonic implementations, when receiving first data, delivery system 230 may receive millions, billions, trillions, etc. of data elements associated with millions, billions, trillions, etc. of deliveries. In this way, delivery system 230 may receive a data set that cannot be processed manually or objectively by human operators.

In some implementations, delivery system 230 may receive first data periodically, according to a schedule, based on requesting the first data, based on input from a user of client device 210, in real-time, and/or the like. For example, a delivery manager may access a customer relationship management (CRM) system an internal or third party CRM system or another type of electronic commerce system integrated with an organization's front-office and/or back office systems that utilizes technology like hypertext markup language (HTML), cascading style sheets (CSS), BootStrap, and/or Javascript) via client device 210 to create a new delivery. Continuing with the previous example, the manager may input first data related to the delivery to create the delivery. In some cases, an individual and/or organization (e.g., a recipient) placing an order may provide the first data. In this way, delivery system 230 may receive first data via a system associated with delivery system 230 and/or an organization with which delivery system 230 is associated. In addition, in this way, delivery system 230 may receive first data in association with an order for an item and/or service being placed.

In some implementations, the first data may relate to a delivery. For example, the first data may include data elements that identify an item and/or service to be delivered, an individual and/or organization to which the item and/or service is to be delivered, a type of the item and/or service (e.g., perishable, valuable, fragile, etc.), a location to which the item and/or service is to be delivered, a quantity of items and/or services to be delivered, a value of the items and/or services, and/or the like. In some implementations, delivery system 230 may receive the first data when an order is placed for an item and/or a service (e.g., via an electronic commerce system).

In some implementations, an item and/or service may include anything that can be offered to a market. For example, an item may include a commodity (refined/unrefined, processed/unprocessed, etc.), a manufactured item, equipment, and/or the like. In some implementations, and for example, a service may include an at-home cable installation, a plumbing service, a lawn care service (e.g., for an individual's residence or an organization's premises), an at-home care service, an equipment service, a food delivery service to an individual or a business), a transportation service (e.g., for an individual or for a good from one business to another business), and/or the like.

In this way, delivery system 230 may receive first data associated with a delivery of an item and/or service.

As further shown in FIG. 4, process 400 may include receiving second data associated with scheduling the delivery (block 420). For example, delivery system 230 may receive, from one or more server devices 220, second data associated with scheduling the delivery. In some implementations, when receiving second data, delivery system 230 may receive millions, billions, trillions, etc. of data elements associated with millions, billions, trillions, etc. of deliveries. In this way, delivery system 230 may receive a data set that cannot be processed manually or objectively by human operators.

In some implementations, second data may include weather data that identifies weather conditions at a location, calendar data that identifies a set of available and/or unavailable times for an individual, traffic data that identifies traffic conditions at a location or on a route to the location, text of a message (e.g., a short message service (SMS) message or an email from client device 210), and/or the like.

In some implementations, delivery system 230 may receive the second data periodically, according to a schedule, based on requesting the second data, based on input from a user of client device 210, in real-time, and/or the like. For example, delivery system 230 may receive second data, such as calendar data for an individual, from server device 220, so as to permit delivery system 230 to identify an available date and/or time for delivery of the item and/or service. Additionally, or alternatively, delivery system 230 may receive second data related to traffic conditions on a route to a location of a delivery, so as to permit delivery system 230 to predict a delivery time for delivery of an item and/or service.

Additionally, or alternatively, and as another example, delivery system 230 may receive second data related to weather conditions at a location where an item and/or service is to be delivered, so as to permit delivery system 230 to recommend a modification to a delivery (e.g., to avoid inclement weather, to modify delivery to avoid damage from inclement weather, etc.). Additionally, or alternatively, and as another example, delivery system 230 may receive second data via a chatbot that delivery system 230 uses to communicate with a user of client device 210 regarding scheduling a delivery, modifying a delivery, and/or the like.

In some implementations, using a chatbot may permit delivery system 230 to communicate with a user of client device 210 in an intelligent and conversational manner using natural language. Additionally, or alternatively, and as another example, delivery system 230 may receive second data related to a prior delivery of an individual to which an item and/or service is to be delivered, and/or another individual to which an item and/or service was delivered, such as another individual in the same or similar geolocation as the individual, that has the same or similar characteristics as the individual, that has the same or similar demographics as the individual, that has the same or similar profile as the individual, that has performed the same or similar behavior as the individual, and/or the like (e.g., perform machine learning, to identify a preference, to generate a recommendation, etc., as described in more detail elsewhere herein).

In some implementations, delivery system 230 may use first data to obtain second data. For example, delivery system 230 may use first data identifying an individual to which an item and/or service is to be delivered to obtain second data, such as calendar data for the individual (e.g., after receiving permission from the individual to obtain the calendar data). Additionally, or alternatively, delivery system 230 may use first data that identifies a location to which an item and/or service is to be delivered to obtain second data related to traffic conditions on a route to the location, weather conditions at the location, and/or the like. This permits delivery system 230 to improve scheduling of a delivery via use of calendar data, weather data, and/or the like. In addition, receiving this type of data in real-time permits delivery system 230 to generate recommended modifications to a delivery in real-time as calendar data, weather data, traffic data, and/or the like changes. In some implementations, when obtaining second data (e.g., calendar data), delivery system 230 may obtain authorization from a recipient of a delivery to access the second data (e.g., by sending a message to client device 210 associated with the recipient).

In this way, delivery system 230 may receive second data associated with scheduling the delivery.

As further shown in FIG. 4, process 400 may include processing the first data and/or the second data using a processing technique to identify information related to scheduling the delivery (block 430). For example, delivery system 230 may process the first data and/or the second data using a processing technique to identify information related to scheduling the delivery.

In some implementations, delivery system 230 may process the first data and/or the second data to identify a date and/or time for delivery of an item and/or service. For example, delivery system 230 may process calendar data of an individual to which an item and/or service is to be delivered to identify an available date and/or time for the delivery. Additionally, or alternatively, and as another example, delivery system 230 may process weather data to determine and/or modify a date and/or time for delivery of the item and/or service a date and/or time that avoids inclement weather). Additionally, or alternatively, and as another example, delivery system 230 may process traffic data to determine a time at which an item and/or service is likely to be delivered, thereby improving the "last mile" and/or "last hour" of a delivery.

In some implementations, delivery system 230 may process the first and/or second data using a set of rules that relates to scheduling a delivery, a preference of an individual to which an item and/or service is to be delivered, and/or the like. For example, delivery system 230 may process first data identifying an item as a valuable item (e.g., an item that has a threshold value). Continuing with the previous example, delivery system 230 may use a set of rules to determine that the item cannot be left at the door of a building to which the item is to be delivered based on the item being a valuable item. In this case, delivery system 230 may use second data identifying an availability of an individual to which the item is to be delivered to determine a time when the individual may be available to receive the item, and may schedule delivery for the identified time.

Additionally, or alternatively, and as another example, delivery system 230 may process first and/or second data using natural language processing, computational linguistics, text analysis, and/or the like (e.g., when first data and/or second data is text). For example, delivery system 230 may use natural language processing to process text of a message from client device 210, communications of a chatbot used for communications between delivery system 230 and a user of client device 210, and/or the like. Continuing with the previous example, delivery system 230 may process the text of a message and/or communications of a chatbot to identify a delivery location, a delivery time, a response to a recommended modification to a delivery, and/or the like.

In some implementations, when processing the first data and/or second data using natural language processing, delivery system 230 may process the first and/or second data to identify a term and/or phrase included in the data. For example, delivery system 230 may adjust characters (e.g., add characters, remove characters, etc.), adjust spacing in the first data and/or second data (e.g., add or remove spaces), expand acronyms included in the first data and/or second data (e.g., replace "EPA" with "Environmental Protection Agency"), replace a symbol with a term (e.g., replace an "@" symbol with the term "at"), convert a term included in the first data and/or second data to a root term (e.g., convert "processing," "processed," or "processor" to "process"), and/or the like. In this way, delivery system 230 may process first data and/or second data so that delivery system 230 can identify a term and/or phrase associated with the first data and/or second data, place the first data and/or second data in a form that delivery system 230 can use, and/or the like.

In some implementations, delivery system 230 may process first data and/or second data using automatic speech recognition (ASR), computer speech recognition, speech-to-text, and/or the like (e.g., when first data and/or second data is audio data, such as natural language audio). For example, delivery system 230 may convert audio from a call to delivery system 230 to text (e.g., a call to schedule or to reschedule a delivery). In this way, delivery system 230 may process first data and/or second data so that delivery system 230 can identify a term and/or phrase associated with the first data and/or second data, place the first data and/or second data in a form that delivery system 230 can use, and/or the like.

In some implementations, delivery system 230 may process first data and/or second data using machine learning and/or a big data technique to perform an analysis of the first data and/or the second data. For example, delivery system 230 may process first data and/or second data associated with a prior delivery for an individual to which an item and/or service is to be delivered, and/or associated with another individual, to identify a preference related a delivery (e.g., to facilitate generation of a recommendation related to scheduling or rescheduling a delivery). Continuing with the previous example, a prior delivery may be associated with second data that indicates a customer satisfaction with the delivery (e.g., customer satisfaction data gathered via a survey, a questionnaire, etc.) and delivery system 230 may use machine learning and/or a big data technique to identify trends among deliveries that are associated with a threshold level of customer satisfaction (e.g., as indicated by a threshold score on a questionnaire, particular terms and/or phrases in text of a survey, etc.). In this way, delivery system 230 may generate recommendations that are more likely to result in a positive customer experience relative to, for example, another recommendation or generating a recommendation randomly.

In some implementations, delivery system 230 may process first data and/or second data in real-time. For example, delivery system 230 may receive weather data and/or calendar data in real-time and may process the weather data and/or the calendar data to determine whether to recommend a modification to a delivery. Additionally, or alternatively, and as another example, delivery system 230 may receive a message indicating a modification to a delivery from client device 210 and may process first data and/or second data associated with the delivery to determine a real-time modification to the delivery based on information included in the message, the first data, and/or the second data. This improves a delivery relative to non-real-time processing of first data and/or second data by permitting delivery system 230 to quickly and dynamically modify a delivery, thereby improving an efficiency and conserving resources that would otherwise be consumed due to a failed delivery.

In this way, delivery system 230 may process the first data and/or the second data using a processing technique to schedule the delivery.

As further shown in FIG. 4, process 400 may include performing an action related to the delivery based on processing the first data and/or the second data (block 440). For example, delivery system 230 may perform an action related to the delivery based on processing the first data and/or the second data.

In some implementations, delivery system 230 may schedule the delivery. For example, delivery system 230 may schedule the delivery for a date, time, and/or location based on the first data and/or the second data. Additionally, or alternatively, and as another example, delivery system 230 may reschedule the delivery to a different date, time, and/or location. In some implementations, delivery system 230 may use a chatbot to communicate with a user of client device 210 when scheduling and/or rescheduling a delivery. For example, delivery system 230 may receive information identifying a requested date and/or time, may receive a request for a modification to a delivery, may confirm a delivery and/or a modification to a delivery, and/or the like based on communications between a user of client device 210 and delivery system 230 via a chatbot.

In some implementations, when scheduling a delivery, delivery system 230 may communicate with a recipient of the delivery to schedule the delivery (e.g., based on a result of processing first data and/or second data). Additionally, or alternatively, when scheduling a delivery, delivery system 230 may communicate with a delivery agent to schedule the delivery (e.g., based on a result of processing first data and/or second data).

In some implementations, delivery system 230 may generate a recommendation related to the delivery. For example, delivery system 230 may generate a recommendation related to a date, time, and/or location of a delivery (e.g., based on calendar data, weather data, traffic data, data associated with prior deliveries, etc.). Additionally, or alternatively, and as another example, delivery system 230 may generate a recommendation to modify a scheduled delivery (e.g., to a different time, location, date, etc.) based on the first data and/or second data. For example, delivery system 230 may identify a calendar conflict with a scheduled delivery, a change in weather at a scheduled location of a delivery, heavy traffic associated with a route to a scheduled location of a delivery, and/or the like, and may generate a recommendation to modify a delivery to avoid the calendar conflict, inclement weather, and/or the like.

In some implementations, delivery system 230 may reorganize multiple deliveries based on a change to first data and/or second data related to a delivery. For example, delivery system 230 may re-determine a route for multiple deliveries, reschedule the multiple deliveries for different dates and/or times, request that an individual meet a delivery vehicle along a route so that the delivery can be guaranteed, and/or the like, such as to minimize a distance traveled of a delivery vehicle, to minimize a cost of the multiple deliveries, to ensure that all deliveries are completed, and/or to perform a threshold quantity of deliveries during a time period (e.g., to reduce a queue of deliveries by a threshold amount so as to prevent a backlog of deliveries). This increases an efficiency of multiple deliveries, thereby conserving resources related to performing multiple deliveries.

In some implementations, delivery system 230 may constantly or periodically receive the first data and/or the second data and may constantly or periodically reorganize multiple deliveries. In this way, delivery system 230 may improve an efficiency of multiple deliveries in real-time.

In some implementations, delivery system 230 may provide a recommendation to client device 210 for display. In implementations, delivery system 230 may provide a recommendation to client device 210 using a chatbot. This permits delivery system 230 to communicate with a user of client device 210 in a conversational manner regarding the recommendation. For example, delivery system 230 may use a chatbot to communicate with a user of client device 210 to determine whether the user wants delivery system 230 to implement a recommendation.

In some implementations, delivery system 230 may send a message to client device 210. For example, delivery system 230 may send a message to client device 210 that includes information related to a delivery (e.g., based on a request from client device 210 for information related to the delivery, based on scheduling or rescheduling the delivery, etc.). Additionally, or alternatively, delivery system 230 may send a message to client device 210 associated with a driver of a delivery vehicle. For example, delivery system 230 may send a message that identifies a modification to a delivery (e.g., a change of time and/or location), that includes a set of instructions to use a different route to the location at which an item and/or service is to be delivered (e.g., to avoid traffic), that causes the driver to leave a facility to deliver an item and/or a service, that causes an item to be loaded on a delivery vehicle, and/or the like.

In some implementations, delivery system 230 may dispatch an autonomous vehicle to deliver an item and/or a service. For example, delivery system 230 may send a message to an autonomous vehicle to cause the autonomous vehicle to be dispatched from a facility. Additionally, or alternatively, delivery system 230 may send a set of instructions to an autonomous vehicle to use a particular route for a delivery and/or to modify a route of the autonomous vehicle based on a modification to a delivery (e.g., by sending a set of instructions to a navigation system associated with the autonomous vehicle).

In some implementations, delivery system 230 may store the first data and/or the second data related to a delivery. For example, delivery system 230 may store the first data and/or the second data using memory resources associated with delivery system 230. In some implementations, delivery system 230 may store the first data and/or the second data to permit machine learning, big data analysis, and/or the like.

In some implementations, when storing the first data and/or the second data, delivery system 230 may aggregate and/or merge the first data and/or the second data with other first data and/or second data, deduplicate the first data and/or the second data, and/or identify missing or corrupted first data and/or second data and obtain replacement first data and/or second data (e.g., using information related to the first data and/or the second data, querying first data and/or second data from server device 220, cross-referencing the first data and/or the second data to identify the missing/corrupted first data and/or second data, and/or the like).

This conserves memory resources of delivery system 230 and/or conserves processing resources of delivery system 230 by reducing errors in the first data and/or second data, reducing duplicate first data and/or second data, and/or the like. In some implementations, delivery system 230 may use a big data tool to aggregate and/or merge the first data and/or the second data (e.g., to aggregate and/or merge millions, billions, trillions, etc., of data elements). This permits delivery system 230 to aggregate and/or merge a data set that cannot be merged manually or objectively by human operators.

In this way, delivery system 230 may perform an action elated to the delivery based on processing the first data and/or the second data. In this way, delivery system 230 may use artificial intelligence, natural language processing, application program interface (API) integration, SMS, and/or the like to intelligently and dynamically schedule a delivery in real-time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. As indicated above, FIG. 4 is provided merely as an example. Other examples are possible and may differ from what was described with regard to FIG. 4.

Figure 5:
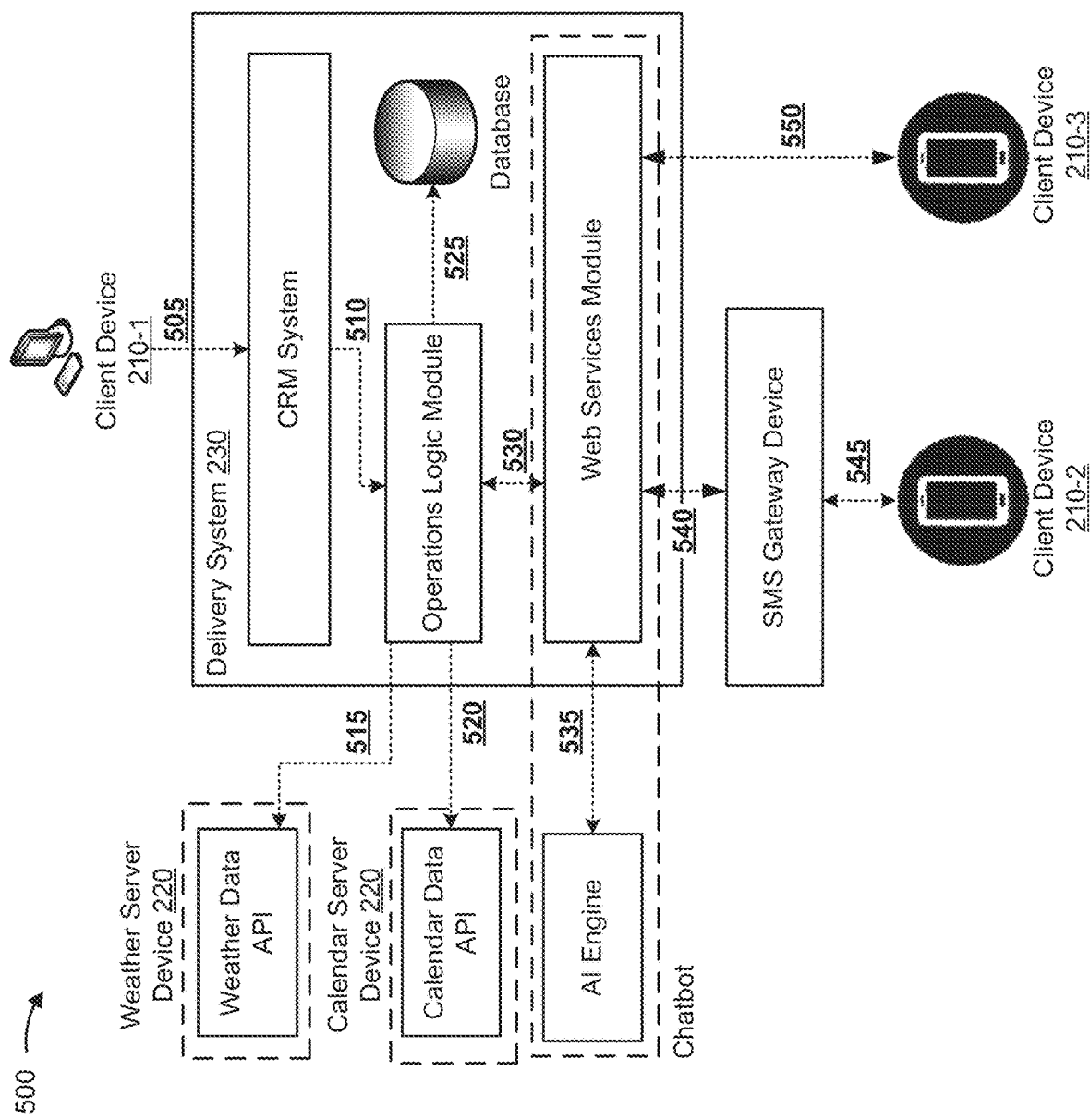
FIG. 5 is a diagram of an example implementation relating to the example process shown in FIG. 4.

FIG. 5 is a diagram of an example implementation 500 relating to example process 400 shown in FIG. 4. FIG. 5 shows an example system architecture related to the implementations described herein. As shown in FIG. 5, example implementation 500 may include client devices 210-1 through 210-3, a set of server devices 220 (e.g., weather server device 220 and calendar server device 220 that include corresponding application program interfaces (APIs), such as Google Calendar), delivery system 230 that includes a CRM system, an operations logic module, a web services module, an artificial intelligence (AI) engine, and a database, and an SMS gateway device.

In some implementations, the elements shown in FIG. 5 may be connected via various communication protocols, such as hypertext transfer protocol (HTTP), HTTP Secure (HTIPS), or SMS, various database protocols, such as open database connectivity (ODBC) or object linking and embedding, database (OLE-DB), and/or the like. In some implementations, internal elements of delivery system 230, such as the operations logic module and the CRM system may be connected via HTTP. Additionally, or alternatively, the operations logic module may be connected to the database via a database protocol. Additionally, or alternatively, delivery system 230 may be connected to external elements, such as the SMS gateway device, weather server device 220 and/or calendar server device 220, via HTTPS. This increases security of communications between delivery system 230 and external elements.

As shown in FIG. 5, and by reference number 505, delivery system 230 may receive first data from client device 210-1. For example, delivery system 230 may receive the first data when a user of client device 210-1 uses a CRM system to generate an entry for a new delivery. As shown by reference number 510, delivery system 230 may receive the first data from the CRM system and may process the first data using an operations logic model (e.g., that utilizes Java or a similar technology). For example, the operations logic module may identify information related to a delivery, such as a location of a delivery (e.g., when the first data includes information identifying a location of a delivery).

Additionally, or alternatively, and as another example, the operation logic module may identify a set of rules related to the delivery (e.g., a set of rules related to a valuable item when the delivery is for a valuable item). Additionally, or alternatively, and as another example, the operation logic module may identify a set of rules related to the type of item and/or service being delivered, the value of the item and/or service being delivered, the type of customer service level associated with a recipient (e.g., a high, medium, or low service level), and/or the like.

As shown by reference number 515, delivery system 230 may use the operations logic module to obtain second data (e.g., weather data) from weather server device 220 (e.g., via a weather API). In some implementations, delivery system 230 may obtain the weather data to permit the operations logic module to use weather data when scheduling the delivery. As shown by reference number 520, delivery system 230 may use the operations logic module to obtain second data (e.g., calendar data) from calendar server device 220. In some implementations, the calendar data may identify an availability or an unavailability of an individual to which an item and/or a service is to be delivered. In some implementations, delivery system 230 may obtain the calendar data to permit the operations logic module to use the calendar data when scheduling the delivery.

As shown by reference number 525, delivery system 230 may use second data stored in a database (e.g., a MySQL database or a MongoDB database) of delivery system 230 when scheduling the delivery. For example, the operations logic module may use second data related to previous deliveries to the same individual to determine a preference of the individual. Additionally, or alternatively, and as another example, the operations logic module may use second data related to deliveries to other individuals to identify characteristics of a delivery that correlates to a threshold customer satisfaction.

For example, the operations logic module may identify particular customer preferences, such as days of the week, times of the day, rescheduling preferences, inclement weather preferences, and/or the like that correlate to a threshold score for customer satisfaction to permit the operations logic module to predict a preference from an individual and/or organization to which an item and/or service is to be delivered). In some implementations, delivery system 230 may determine a recommended date, time, and/or location for the delivery based on the first and second data.

As shown by reference number 530, the operations logic module may provide information identifying a date, time, and/or location for the delivery to a web services module (e.g. that utilizes Java or a similar technology and provides connectivity between the AI engine and the operations logic module). In some implementations, the web services module may schedule the delivery, add information identifying the delivery to a queue of deliveries, and/or the like. In some implementations, the web services module may be associated with a chatbot. For example, delivery system 230 may use the chatbot to communicate, in a conversational and natural language manner, with a user of client device 210 regarding a delivery, as described in more detail below.

As shown by reference number 535, the web services module may use the AI engine (e.g., like Watson) to generate messages (e.g., SMS messages) to provide to client device 210, to process a message from client device 210 (e.g., process a natural language response using natural language processing), generate a response message to a message from client device 210, and/or the like. For example, the web services module may use the AI engine to generate a message that includes information identifying a delivery that the web services module scheduled. In some implementations, the AI engine may be capable of understanding context and/or semantics of a message based on a term and/or phrase included in natural language text received from client device 210. For example, the AI engine may perform a look up of a term and/or phrase in a data structure that includes a set of terms and/or phrases and corresponding context and/or sentiment indicators.

As shown by reference number 540, delivery system 230 may exchange information related to the delivery with the SMS gateway device (e.g., a device that connects internet-based systems, such as delivery system 230, and network 240, and utilizes MessageBird, Twilio, or a similar technology). For example, the web services module may exchange SMS messages with the SMS gateway device using a chatbot. As shown by reference number 545, the SMS gateway device may exchange messages with client device 210-2. For example, the SMS gateway device may exchange SMS messages that relate to scheduling a delivery, modifying a delivery, and/or the like. In some implementations, the web services module, the SMS gateway device, and/or client device 210-2 may exchange messages in real-time.

As shown by reference number 550, the web services module and client device 210-3 may exchange messages. For example, client device 210-3 may be associated with a driver of a vehicle delivering an item and/or a service and the web services module and client device 210-3 may exchange messages related to updating a delivery that was modified by a user of client device 210-2, updating a route based on a modified delivery, and/or the like. In some implementations, the web services module and client device 210-3 may exchange messages in real-time.

In this way, delivery system 230 may use artificial intelligence, natural language processing, API integration, SMS, and/or the like to intelligently and dynamically schedule a delivery in real-time.

As indicated above, FIG. 5 is provided merely as an example. Other examples are possible and may differ from what was described with regard to FIG. 5.

Figure 6:
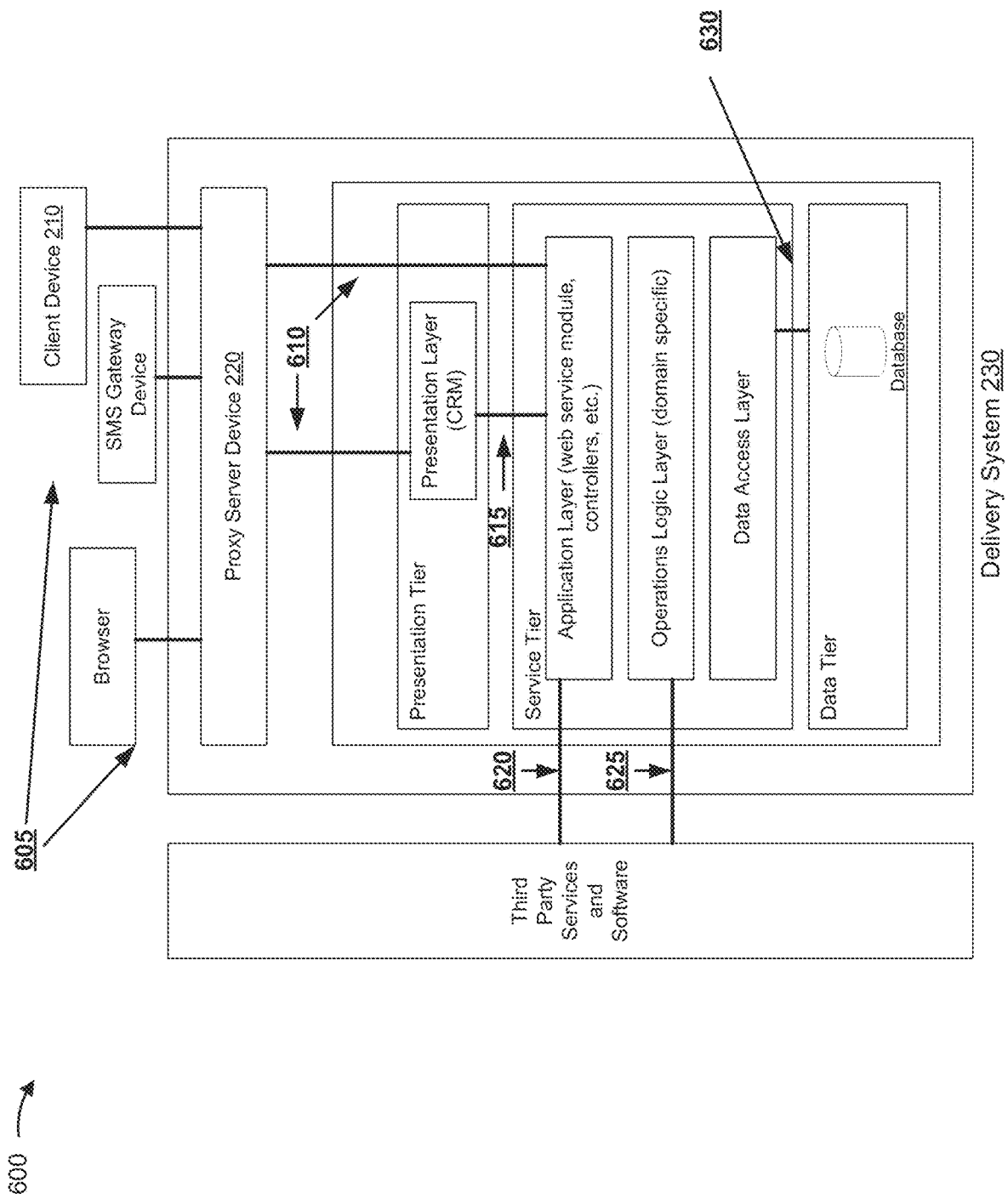
FIG. 6 is a diagram of an example implementation relating to the example process shown in FIG. 4.

FIG. 6 is a diagram of an example implementation 600 relating to example process 400 shown in FIG. 4. FIG. 6 shows an example of a physical and/or logical architecture related to the implementations described herein. As shown in FIG. 6, example implementation 600 may include client device 210, a browse associated with client device 210 or another client device 210), an SMS gateway device, delivery system 230 that includes proxy server device 220, a presentation tier (e.g., including a presentation layer of a CRM system), a service tier (e.g., that includes an application layer, an operations logic layer, and a data access layer), and a data tier, and third party services and software (e.g., provided by, or executing on, third party devices).

As shown by reference number 605, a browser, client device 210, and/or the SMS gateway device may be connected to proxy server device 220. For example, the browser, the SMS gateway, and/or client device 210 may exchange data and/or messages with delivery system 230 via proxy server device 220. As shown by reference number 610, proxy server device 220 may be connected to the presentation tier of delivery system 230 (e.g., via a connection to the presentation layer of the CRM system) and/or the service tier of delivery system 230 (e.g., via a connection to the application layer of delivery system 230). It some implementations, the presentation tier and/or the presentation layer may operate on one or more computing resources 234 and may be associated with providing information for display.

As shown by reference number 615, the presentation layer may be connected to the application layer of the service tier of delivery system 230. In some implementations, the service tier may operate on one or more computing resources 234 and may be associated with providing and/or serving third-party services and/or applications (e.g., via the application layer). In some implementations, the application layer may operate on one or more computing resources 234 and may specify shared protocols and/or interface methods used by hosts in a communication network.

As shown by reference number 620, the application layer of the service tier may be connected to third party services and/or software. For example, delivery system 230 may use the application layer to obtain calendar data, weather data, and/or other types of second data from server devices 220, as described elsewhere herein.

As shown by reference number 625, the service tier may include an operations logic layer (e.g., associated with the operations logic module described above) that is connected to third party services and/or software. For example, the operations logic layer may operate on one or more computing resources 234 and may communicate with the third party services and/or software to determine a set of rules, to verify that a delivery satisfies a set of rules, and/or the like. In some implementations, the operations logic layer may be domain specific. For example, an operations logic layer implemented in a retail delivery context may be different than an operations logic layer implemented in a manufacturing delivery context. Continuing with the previous example, the operations logic layer may use different sets of rules for different contexts.

As shown by reference number 630, the service tier of delivery system 230 may be connected to a data tier of delivery system 230 via a data access layer. In some implementations, the data tier may operate on one or more computing resources 234 and may be associated with storing and/or retrieving information from a database or a file system. For example, the database shown in FIG. 6 may store data related to other deliveries that delivery system 230 can use to perform machine learning, to identify a preference of an individual to which an item and/or service is to be delivered, and/or the like.

In some implementations, information retrieved from the data tier may be processed by the service tier (e.g., using third party services and/or software) and may be provided for display via the presentation tier. In some implementations, the data access layer may operate on one or more computing resources 234 and may provide access to data stored in persistent storage (e.g., a database of the data tier).

As indicated above, FIG. 6 is provided merely as an example. Other examples are possible and may differ from what was described with regard to FIG. 6.

Figure 7A:
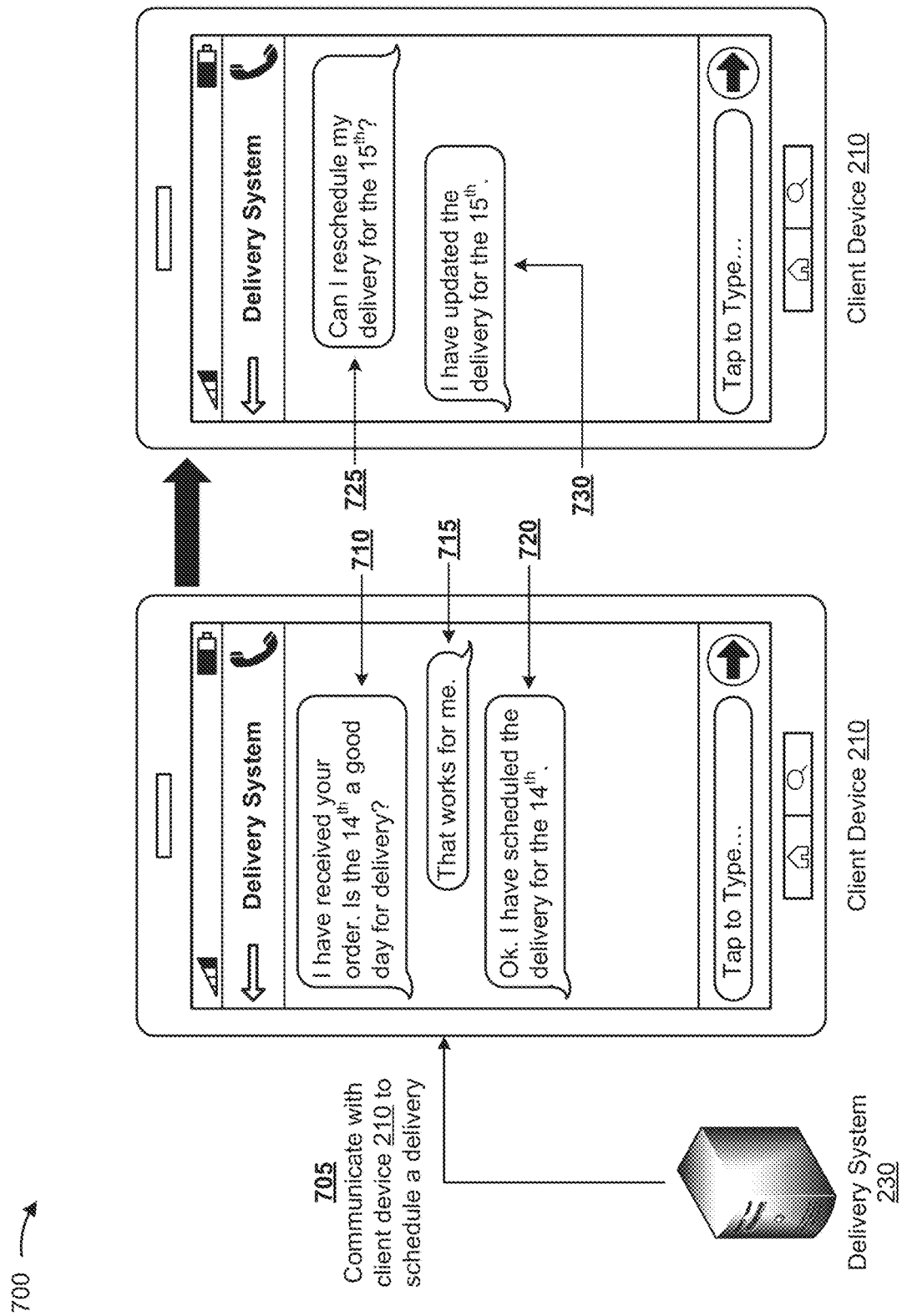
FIGS. 7A-7C are diagrams of an example implementation relating to the example process shown in FIG. 4.
Figure 7B:
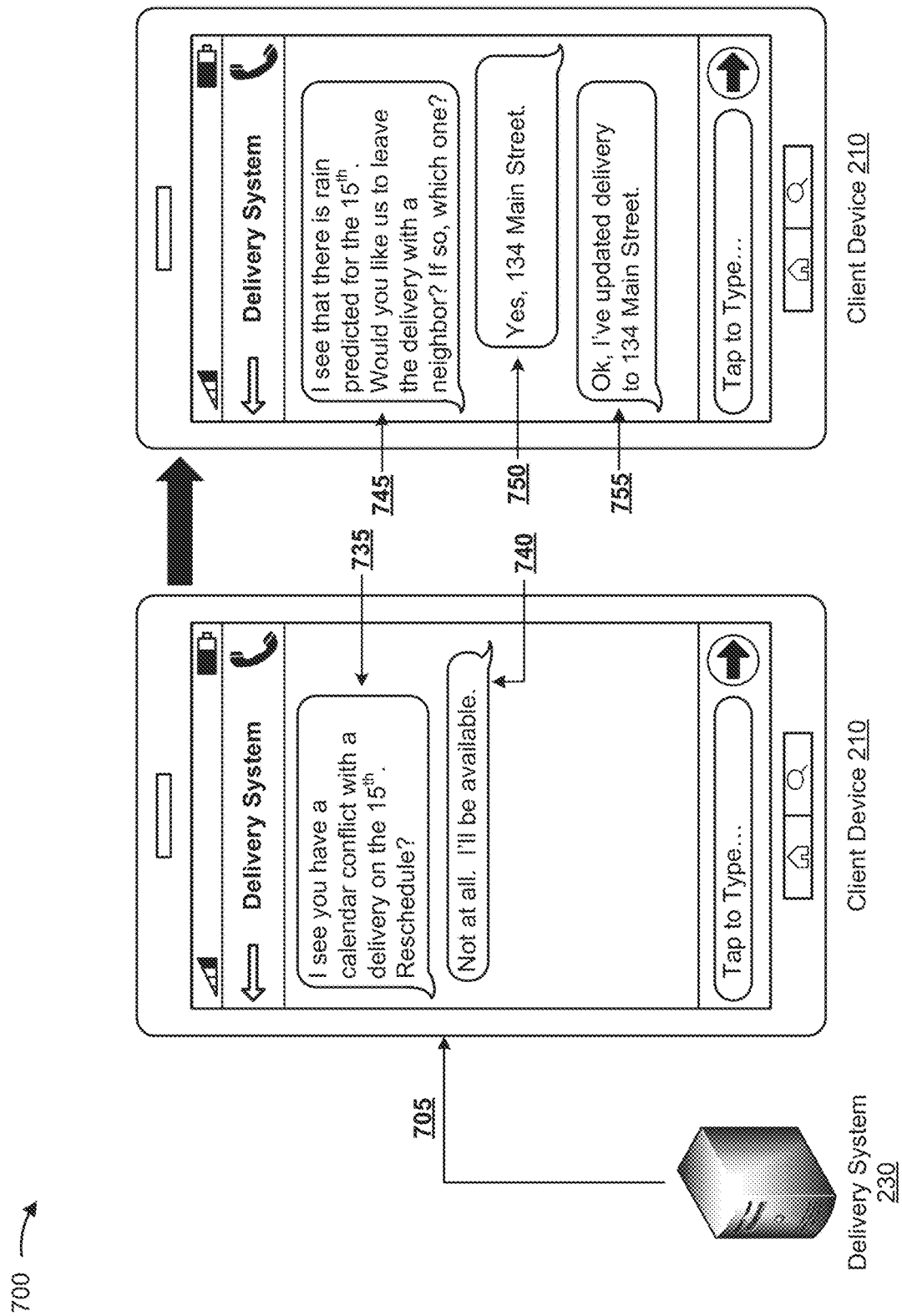
Figure 7C:
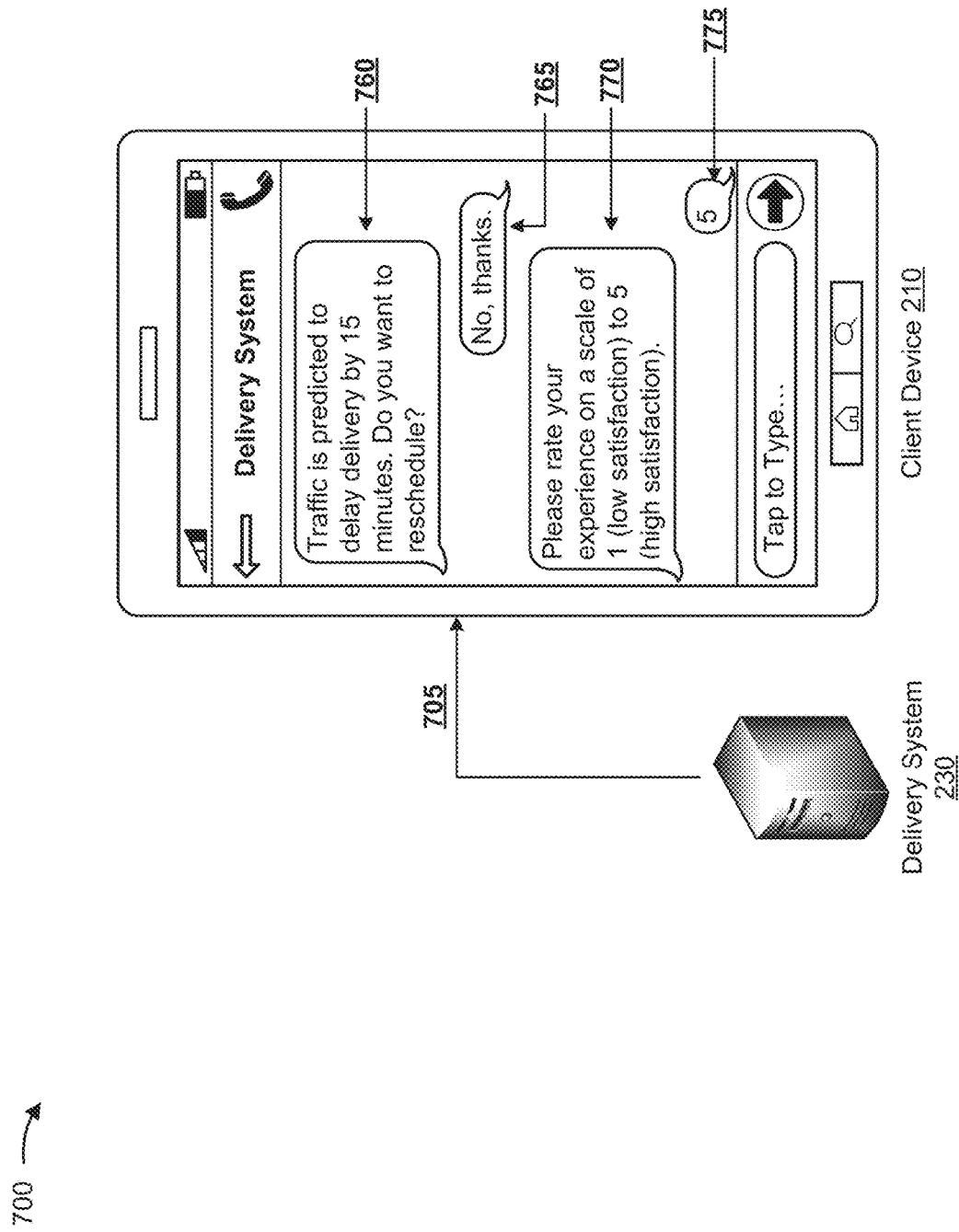

FIGS. 7A-7C are diagrams of an example implementation 700 relating to example process 400 shown in FIG. 4. FIGS. 7A-7C show an example of real-time intelligent and dynamic delivery scheduling. As shown in FIG. 7A, example implementation 700 includes delivery system 230 and client device 210.

As shown in FIG. 7A, and by reference number 705, delivery system 230 may communicate with client device 210 to schedule a delivery. For example, delivery system 230 may use a chatbot to communicate with client device 210 using SMS messages. Continuing with the previous example, delivery system 230 may use an AI engine that implements natural language processing to process and/or generate the SMS messages. In this way, delivery system 230 may intelligently communicate with a user of client device 210 in a conversational and natural language manner.

As shown by reference number 710, delivery system 230 may provide a message to client device 210 requesting confirmation of a recommended date for delivery of an item and/or service (e.g., the $14^{th}$ of the month). For example, delivery system 230 may have processed second data (e.g., calendar data or weather data) to identify the $14^{th}$ as a day when a user of client device 210 is available to receive the delivery, as a day when inclement weather is not forecasted, and/or the like.

As shown by reference number 715, a user of client device 210 may input a natural language response to the message from delivery system 230. For example, the user may input the text "That works for me." to confirm the $14^{th}$ as the date for delivery. In some implementations, delivery system 230 may receive the response message and may process the response message using natural language processing to determine whether the user has confirmed the recommended date as the date for delivery. As shown by reference number 720, delivery system 230 may use an AI engine to generate the message "Ok. I have scheduled the delivery for the $14^{th}$," to indicate to the user of client device 210 that the delivery was successfully scheduled for the $14^{th}$;

In some implementations, delivery system 230 may generate a calendar item (e.g., an appointment, an event, an invite, etc.) for the user of client device 210 that indicates a date, a time, a location, and/or the like for the delivery. In some implementations, delivery system 230 may provide the calendar item to client device 210 to cause the calendar item to be added to an electronic calendar associated with the user of client device 210. In this way, delivery system 230 may intelligently and dynamically schedule a delivery.

As shown by reference number 725, after confirming the date of delivery, the user of client device 210 may send a message to delivery system 230 requesting to reschedule the delivery. For example, the message may include the text "Can I reschedule my delivery for the $15^{th}$?" In some implementations, delivery system 230 may process the text of the message using natural language processing to determine that the user of client device 210 is requesting to reschedule the delivery from the 14$^{th}$ to the 15$^{th}$.

In some implementations, when delivery system 230 receives the message requesting to reschedule the delivery, delivery system 230 may process second data (e.g., calendar data or weather data) to determine whether the requested date is suitable for delivery. Additionally, or alternatively, delivery system 230 may determine whether delivery on the requested date satisfies a set of rules. In some implementations, delivery system 230 may reschedule the delivery for the requested date.

As shown by reference number 730, delivery system 230 may provide a message to client device 210 indicating that the delivery has been rescheduled for the requested date. For example, the message may include the text "I have updated the delivery for the 15$^{th}$." in this way, delivery system 230 may intelligently and dynamically reschedule a delivery via use of a chatbot and/or natural language processing.

As shown in FIG. 7B, and by reference number 735, after rescheduling the delivery, delivery system 230 may determine that the user has added a calendar appointment that conflicts with the rescheduled delivery, and may provide a message to client device 210 that indicates the conflict. For example, the message may include the text "I see you have a calendar conflict with a delivery on the 15$^{th}$. Reschedule?" As shown by reference number 740, client device 210 may provide a response message that the user of client device 210 input. For example, the message may include the text "Not at all. I'll be available." in some implementations, delivery system 230 may process the text of the response message to determine that the user of client device 210 does not want to reschedule the delivery from the 15$^{th}$. In this way, delivery system 230 may monitor second data and intelligently notify a user of client device 210 when a calendar appointment conflicts with a scheduled delivery.

As shown by reference number 745, while monitoring second data (e.g., weather data), delivery system 230 may determine that inclement weather is forecasted for the same day and/or time as a delivery, and may provide a message to client device 210 to notify a user of client device 210 of the inclement weather and to determine whether the user wants to modify the delivery. For example, the message may include the text "I see that there is rain predicted for the 15$^{th}$. Would you like us to leave the delivery with a neighbor? If so, which one?" Continuing with the previous example, delivery system 230 may use the message to determine whether the user of client device 210 wants an item to be delivered to a neighbor, so as to avoid damage due to the inclement weather. In some implementations, delivery system 230 may generate the recommendation to use a neighbor for delivery based on delivery system 230 performing machine learning on information related to other deliveries.

As shown by reference number 750, client device 210 may provide a message indicating that the user wants the item to be delivered to a neighbor and may provide an address to which the item is to be delivered. For example, the message may include the text "Yes, 134 Main Street." where 134 Main Street is the address to which the item is to be delivered. In some implementations, the address may be selected from a map, such that the message provided to delivery system 230 includes, for example, a set of latitude and longitude coordinates, or another location identifier. In some implementations, when delivery system 230 receives the message, delivery system 230 may process the message using natural language processing to determine whether the user wants to modify the delivery and/or a manner in which to modify the delivery (e.g., a modification to delivery address).

As shown by reference number 755, delivery system 230 may provide a message to client device 210 indicating that the delivery has been modified based on the response message from client device 210. For example, the message may include the text "Ok, I've updated delivery to 134 Main Street." In this way, delivery system 230 may intelligently notify a user of client device 210 when inclement weather may interfere with a scheduled delivery.

As shown in FIG. 7C, and by reference number 760, on the day of delivery, delivery system 230 may provide a message to client device 210 to inform a user of client device 210 that traffic may delay delivery by a threshold amount of time (e.g., by monitoring second data, such as traffic data). For example, the message may include the text "Traffic is predicted to delay delivery by 15 minutes. Do you want to reschedule?" to determine whether a user of client device 210 wants to reschedule the delivery based on the delay.

As shown by reference number 765, client device 210 may provide a message to delivery system 230 indicating that the user does not want to reschedule. For example, the message may include the text "No, thanks." In some implementations, delivery system 230 may process the text of the message using natural language processing to determine that the user of client device 210 does not want to reschedule. In this way, delivery system 230 may improve the "last mile" and/or "last hour" of a delivery by providing real-time intelligent and dynamic delivery scheduling.

As shown by reference number 770, after a delivery has been completed, delivery system 230 may provide a message to client device 210 requesting input related to an experience and/or satisfaction of a user of client device 210. For example, the message may include the text "Please rate your experience on a scale of 1 (low satisfaction) to 5 (high satisfaction)." to prompt the user to input a score from one to five to indicate a level of satisfaction with the delivery. As shown by reference number 775, client device 210 may provide a message to delivery system 230 that includes text "5," indicating that the user's level of satisfaction is a five on a scale of one to five (e.g., indicating a high level of satisfaction).

In some implementations, delivery system 230 may store information related to the delivery and a corresponding level of satisfaction, and may perform machine learning to determine aspects of a delivery that contribute to positive experience, a negative experience, and/or the like (e.g., in combination with information related to other deliveries). Additionally, or alternatively, when information related a level of satisfaction (e.g., a score) provided to delivery system 230 satisfies a threshold, delivery system 230 may provide a message to client device 210 to prompt a user to input additional text regarding the user's experience and/or level of satisfaction.

In some implementations, when delivery system 230 receives the additional text, delivery system 230 may process the text using natural language processing. For example, delivery system 230 may process the text to identify a term and/or phrase that indicates a particular positive or negative sentiment (e.g., using a data structure that includes terms and/or phrases and corresponding sentiment indicators). In some implementations, delivery system 230 may perform analytics on information related to the delivery to identify, for example, particular delivery personnel associated with a threshold level of satisfaction, particular customers associated with a threshold level of satisfaction, and/or the like.

In this way, delivery system 230 may use artificial intelligence, natural language processing, SMS, and/or the like to intelligently and dynamically schedule a delivery in real-time.

As indicated above, FIGS. 7A-7C are provided merely as an example. Other examples are possible and may differ from what was described with regard to FIGS. 7A-7C.

Some implementations, described herein, provide a delivery system that is capable of receiving first data associated with a delivery of an item and/or service, receiving second data associated with scheduling the delivery, processing the first data and/or the second data to intelligently schedule the delivery, and/or performing an action related to the delivery. In this way, the delivery system provides a computer-based system to intelligently manage the "last mile" or "last hour" of a delivery (e.g., based on weather data, calendar data, etc.), thereby improving a delivery. In addition, this conserves resources, such as processing resources of a device scheduling a delivery, vehicle-related resources, such as fuel, cost, or wear-and-tear related to performing a delivery, and/or the like, by reducing or eliminating a need for a delivery to be scheduled and/or attempted multiple times. Further, this improves an individual's experience related to a delivery via intelligent and dynamic scheduling of the delivery.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user a user may change the size of the user interface, information provided via the user interface, a position of information provided via the user interface, etc). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a first device, first data associated with multiple deliveries of multiple items or services,
        the first data identifying
            multiple recipients to which the multiple items or services are to be delivered;
    receiving, by the first device, second data associated with scheduling the multiple deliveries,
        a first portion of the second data being received via a chatbot that can communicate with multiple second devices associated with the multiple recipients, and
        a second portion of the second data being received from multiple third devices;
    processing, by the first device, the first data and the second data using a machine learning technique to identify information related to scheduling the multiple deliveries,
        the machine learning technique to identify particular customer preferences associated with prior deliveries,
        the machine learning technique to identify a trend based on the particular customer preferences satisfying a threshold score associated with a level of customer satisfaction associated with the prior deliveries, and
        processing the second data comprising:
            processing the second data to identify at least one of:
                a date or time for one of the multiple deliveries,
                a weather condition at a location associated with the one of the multiple deliveries, or
                a traffic condition on a route to the one of the multiple deliveries;
    performing, by the first device, multiple actions related to the multiple deliveries based on the trend and after identifying at least one of the date or time, the weather condition, or the traffic condition,
        the multiple actions including:

scheduling at least one of the multiple deliveries based on a result of processing the first data and the second data,
monitoring the first data or the second data to determine a modification to the first data or the second data, or
modifying at least one of the multiple deliveries based on the modification to the first data or the second data; and
causing, by the first device, an autonomous vehicle to be dispatched to deliver at least one item or service of the multiple items or services based on the trend.

2. The method of claim 1, further comprising:
receiving a request from one of the multiple second devices to reschedule one of the multiple deliveries;
determining a manner in which to modify the one of the multiple deliveries by processing text associated with the request using natural language processing; and
where performing the multiple actions comprises:
rescheduling the one of the multiple deliveries based on the manner in which to modify the one of the multiple deliveries.

3. The method of claim 1, where performing the multiple actions comprises:
determining the modification to the first data or the second data;
generating a recommendation related to one of the multiple deliveries,
the recommendation including delivering one of the multiple items or services to a neighbor of one of the multiple recipients,
the recommendation relating to modifying the one of the multiple deliveries according to the modification; and
providing information indicating the recommendation to one of the multiple second devices for display.

4. The method of claim 1, further comprising:
determining that traffic on multiple routes to multiple locations of the multiple deliveries is to delay the multiple deliveries by a threshold amount of time;
determining to reroute the multiple deliveries to avoid the traffic; and
where performing the multiple actions comprises:
providing multiple messages to multiple fourth devices associated with multiple vehicles that are delivering the multiple items or services to cause the multiple fourth devices to determine multiple different routes to the multiple locations.

5. The method of claim 1, where receiving the second data comprises:
receiving a short message service (SMS) message that includes natural language text,
the natural language text including the second data; and
where processing the first data and the second data comprises:
processing the natural language text of the SMS message using natural language processing to determine the second data.

6. The method of claim 1, further comprising:
transmitting a message to the autonomous vehicle to cause the autonomous vehicle to be dispatched from a facility.

7. A first device, comprising:
one or more processors to:
receive first data associated with multiple deliveries of multiple items or services,
the first data identifying:
multiple recipients to which the multiple items or services are to be delivered;
receive second data associated with scheduling the multiple deliveries,
a first portion of the second data being received via a chatbot that can communicate with multiple second devices associated with the multiple recipients, and
a second portion of the second data being received from multiple third devices;
process the first data and the second data using a machine learning technique to identify information related to scheduling the multiple deliveries,
the machine learning technique to identify particular customer preferences associated with prior deliveries,
the machine learning technique to identify a trend based on the particular customer preferences satisfying a threshold score associated with a level of customer satisfaction associated with the prior deliveries, and
where the one or more processors, when processing the second data, are to:
process the second data to identify at least one of:
a date or time for one of the multiple deliveries,
a weather condition at a location associated with the one of the multiple deliveries, or
a traffic condition on a route to the one of the multiple deliveries;
perform multiple actions related to the multiple deliveries based on the trend and after identifying at least one of the date or time, the weather condition, or the traffic condition,
the multiple actions including:
scheduling at least one of the multiple deliveries based on a result of processing the first data and the second data,
monitoring the first data or the second data to determine a modification to the first data or the second data, or
modifying at least one of the multiple deliveries based on the modification to the first data or the second data; and
cause an autonomous vehicle to be dispatched to deliver at least one item or service of the multiple items or services based on the trend.

8. The first device of claim 7, where the one or more processors are further to:
receive a request from one of the multiple second devices to reschedule one of the multiple deliveries;
determine a manner in which to modify the one of the multiple deliveries by processing text associated with the request using natural language processing; and
where the one or more processors, when performing the multiple actions, are to:
reschedule the one of the multiple deliveries based on the manner in which to modify the one of the multiple deliveries.

9. The first device of claim 7, where the one or more processors, when performing the multiple actions, are to:
determine the modification to the first data or the second data;
generate a recommendation related to one of the multiple deliveries,
the recommendation including delivering one of the multiple items or services to a neighbor of one of the multiple recipients, the recommendation relating to modifying the one of the multiple deliveries according to the modification; and provide information indicating the recommendation to one of the multiple second devices for display.

10. The first device of claim 7, where the one or more processors are further to:
determine that traffic on multiple routes to multiple locations of the multiple deliveries is to delay the multiple deliveries by a threshold amount of time;
determine to reroute the multiple deliveries to avoid the traffic; and
where the one or more processors, when performing the multiple actions, are to:
provide multiple messages to multiple fourth devices associated with multiple vehicles that are delivering the multiple items or services to cause the multiple fourth devices to determine multiple different routes to the multiple locations.

11. The first device of claim 7, where the one or more processors, when receiving the second data, are to:
receive a short message service (SMS) message that includes natural language text,
the natural language text including the second data; and
where the one or more processors, when processing the first data and the second data, are to:
process the natural language text of the SMS message using natural language processing to determine the second data.

12. The first device of claim 7, where the one or more processors, when processing the first data and the second data, are to:
process the first data and the second data using the machine learning technique to identify one or more preferences of the multiple recipients.

13. The first device of claim 7, where the one or more processors are to:
receive a request from one of the multiple second devices to reschedule one of the multiple deliveries;
determine a manner in which to modify the one of the multiple deliveries by processing text associated with the request using natural language processing;
where the one or more processors, when performing the multiple actions, are to:
reschedule the one of the multiple deliveries based on the manner in which to modify the one of the multiple deliveries; and
provide a message indicating that the one of the multiple deliveries has been rescheduled.

14. A non-transitory computer-readable medium storing instructions, the instructions comprising:
one or more instructions that, when executed by one or more processors of a first device, cause the one or more processors to:
receive first data associated with multiple deliveries of multiple items or services,
the first data identifying
multiple recipients to which the multiple items or services are to be delivered;
receive second data associated with scheduling the multiple deliveries,
a first portion of the second data being received via a chatbot that can communicate with multiple second devices associated with the multiple recipients, and
a second portion of the second data being received from multiple third devices;

process the first data and the second data using a machine learning technique to identify information related to scheduling the multiple deliveries,
the machine learning technique to identify particular customer preferences associated with prior deliveries,
the machine learning technique to identify a trend based on the particular customer preferences satisfying a threshold score associated with a level of customer satisfaction associated with the prior deliveries, and
where the one or more instructions, that cause the one or more processors process the second data, cause the one or more processors to:
process the second data to identify at least one of:
a date or time for one of the multiple deliveries,
a weather condition at a location associated with the one of the multiple deliveries, or
a traffic condition on a route to the one of the multiple deliveries;
perform multiple actions related to the multiple deliveries based on the trend and after identifying at least one of the date or time, the weather condition, or the traffic condition,
the multiple actions including:
scheduling at least one of the multiple deliveries based on a result of processing the first data and the second data,
monitoring the first data or the second data to determine a modification to the first data or the second data, or
modifying at least one of the multiple deliveries based on the modification to the first data or the second data; and
cause an autonomous vehicle to be dispatched to deliver at least one item or service of the multiple items or services based on the trend.

15. The non-transitory computer-readable medium of claim 14, where the one or more instructions, when executed by the one or more processors, further cause the one or more processors to:
receive a request from one of the multiple second devices to reschedule one of the multiple deliveries;
determine a manner in which to modify the one of the multiple deliveries by processing text associated with the request using natural language processing; and
where the one or more instructions, that cause the one or more processors to perform the multiple actions, cause the one or more processors to:
reschedule the one of the multiple deliveries based on the manner in which to modify the one of the multiple deliveries.

16. The non-transitory computer-readable medium of claim 14, where the one or more instructions, that cause the one or more processors to perform the multiple actions, cause the one or more processors to:
determine the modification to the first data or the second data;
generate a recommendation related to one of the multiple deliveries,
the recommendation including delivering one of the multiple items or services to a neighbor of one of the multiple recipients,
the recommendation relating to modifying the one of the multiple deliveries according to the modification; and provide information indicating the recommendation to one of the multiple second devices for display.

17. The non-transitory computer-readable medium of claim 14, where the one or more instructions, when executed by the one or more processors, further cause the one or more processors to:
- determine that traffic on multiple routes to multiple locations of the multiple deliveries is to delay the multiple deliveries by a threshold amount of time;
- determine to reroute the multiple deliveries to avoid the traffic; and
- where the one or more instructions, that cause the one or more processors to perform the multiple actions, cause the one or more processors to:
  - provide multiple messages to multiple fourth devices associated with multiple vehicles that are delivering the multiple items or services to cause the multiple fourth devices to determine multiple different routes to the multiple locations.

18. The non-transitory computer-readable medium of claim 14, where the one or more instructions, that cause the one or more processors to receive the second data, cause the one or more processors to:
- receive a short message service (SMS) message that includes natural language text,
  the natural language text including the second data; and
- where the one or more instructions, that cause the one or more processors to process the first data and the second data, cause the one or more processors to:
  - process the natural language text of the SMS message using natural language processing to determine the second data.

19. The non-transitory computer-readable medium of claim 14, where the one or more instructions, that cause the one or more processors to process the first data and the second data, cause the one or more processors to:
- process the first data and the second data using the machine learning technique to identify one or more preferences of the multiple recipients.

20. The non-transitory computer-readable medium of claim 14, where the one or more instructions, when executed by the one or more processors, further cause the one or more processors to:
- receive a request from one of the multiple second devices to reschedule one of the multiple deliveries;
- determine a manner in which to modify the one of the multiple deliveries by processing text associated with the request using natural language processing;
- where the one or more processors, when performing the multiple actions, are to:
  - reschedule the one of the multiple deliveries based on the manner in which to modify the one of the multiple deliveries; and
- provide a message indicating that the one of the multiple deliveries has been rescheduled.

* * * * *